3,482,304
METHOD OF ASSEMBLY OF BI-METALLIC TUBES
BY WELDING WITHOUT FILLER METAL
Camille Brigot, La Varenne, and Roger Droussent, Chilly-Mazarin, France, assignors to Commissariat a l'Energie Atomique, Paris, France
Filed Aug. 11, 1967, Ser. No. 660,070
Claims priority, application France, Aug. 25, 1966, 74,129, 74,130
Int. Cl. B23k 31/06
U.S. Cl. 29—471.1      4 Claims

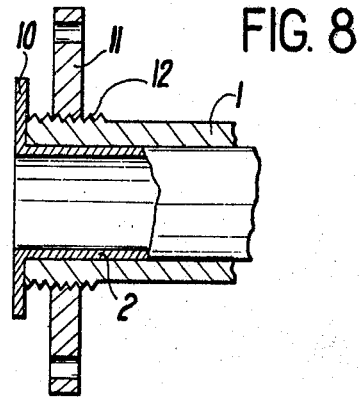
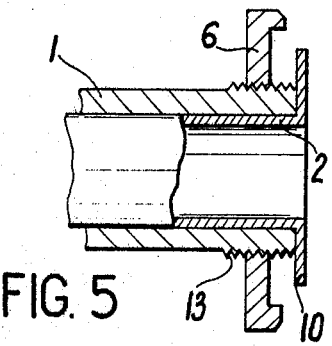
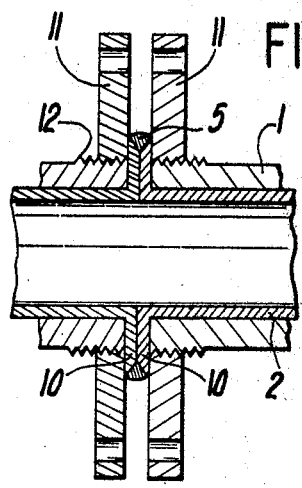
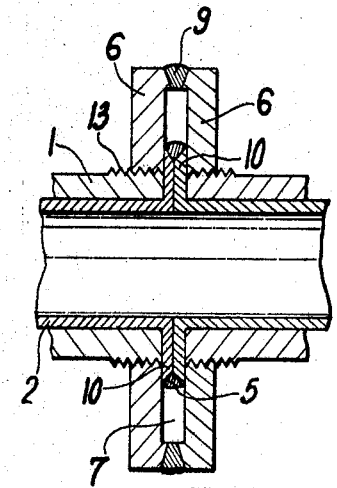
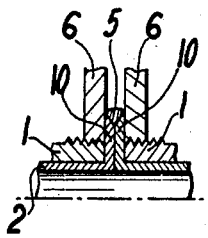
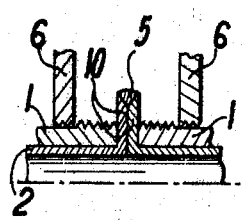
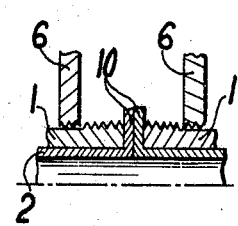

ABSTRACT OF THE DISCLOSURE

The method of assembly whereby two tube elements are joined by welding without addition of filler metal, each tube element being constituted by an outer tube formed of a first metal and by a tube lining formed of a second metal, consists in welding the tube lining extremities to each other without the use of filler metal and in securely joining the outer tubes of the two elements to be assembled.

---

This invention relates to a method of assembly of two tube elements by welding without the use of filler metal, each tube element being constituted by an outer tube which is formed of a first metal and by an internal lining which is formed of a second metal.

The method under consideration is particularly well suited for welding tubes of the type employed for the purpose of circulating a corrosive gas which is liable to attack the first metal referred-to (for example in plants for the separation of uranium isotopes). The method offers the double advantage of affording effective corrosion resistance and of being inexpensive to carry into practice.

More specifically, the present invention is concerned with a method of assembly by welding without the use of filler metal, said method being characterized in that it consists in relieving each end portion of the outer tube so as to free the tube lining at each extremity of the tube elements to be assembled, in welding said tube lining extremities to each other without the use of filler metal and in securely joining the outer tubes of the two tube elements to be assembled by means of two metallic members which are welded to each other without filler metal so as to constitute a shell-type assembly which surrounds the weld seam of said tube linings.

In a first embodiment, the method according to the invention consists in cutting a chamfered edge near the extremity of each outer tube of the two tube elements to be assembled and in baring the tube lining over a short distance, in joining the ends of the linings of the two between the chamfered edges of the two outer tubes a metallic member which is applied in closely-fitting contact with said chamfered edges but which does not come into contact with the tube linings and in joining said metallic member to the two outer tubes by welding without filler metal along the external line of contact of said member with each of said two outer tubes.

A bore which can be sealed at will is advantageously formed in the above-mentioned metallic member in order that the state of the joint formed between the two tube linings may be inspected at any time and also in order that an inert gas may be introduced through said bore into the annular space formed between said metallic member and the tube linings.

In a second embodiment, the method according to the invention consists in providing a screw-thread on the outer tubes at the ends of the tube elements to be assembled, in screwing a clamping-collar on each of the two threaded ends, in outwardly flanging the two tube linings at each end of the tube elements to be assembled, in welding said two flanged portions to each other along the outer periphery thereof without the use of filler metal, in displacing the two clamping-collars along the threaded tube-ends until said collars are applied against the flanged portions and in joining said two clamping-collars by welding.

Further properties and advantages of the present invention will become apparent from the following description of two forms of execution of the method according to the invention which are given solely by way of explanation and not in any sense by way of limitation. Referring to the accompanying drawings, FIGURES 1 to 4 correspond to a first form of execution of the method whilst FIGS. 5, 6, 7a, 7b, 7c, 8 and 9 relate to a second form of execution.

In these drawings:

FIG. 5 is an axial sectional view of a tube element which is intended to be joined to another tube element in accordance with the second form of execution of the method according to the invention;

FIG. 6 shows two tube elements which have been placed end-to-end and joined together;

FIGS. 7a, 7b, 7c show the three stages of operation which are entailed in the event of replacement of the ducting; and finally FIGS. 8 and 9 are similar to FIGS. 5 and 6 and are distinguished from these latter only by the clamping-collars.

Figure 1:
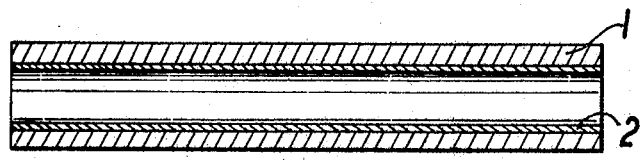
FIG. 1 is an axial sectional view of one of the two tube elements to be assembled.

In the first form of execution of the method according to the invention:

The tube element as shown in FIG. 1 is constituted by an outer tube 1 which may be formed of mild steel, for example, said outer tube being fitted with a liner tube 2 which can be made, for example, of nickel.

The object of the invention is to permit an assembly such that there is no contact between the mild steel of the assembled tube elements and a corrosive gas which circulates within said tubes and not even any contact between the mild steel and the line of junction of the internal linings of the two assembled tube elements.

Figure 2:
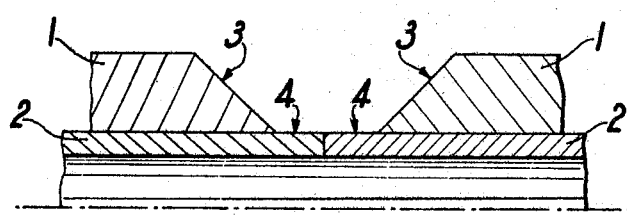
FIG. 2 shows the two tube elements which are placed in end-to-end relation after completion of the chamfering operation.

Accordingly, the two tube elements to be assembled are first chamfered as shown at 3 in FIG. 2 and the liner tubes 2 are laid bare over a short distance (as designated by the reference 4 in FIG. 2).

Figure 3:
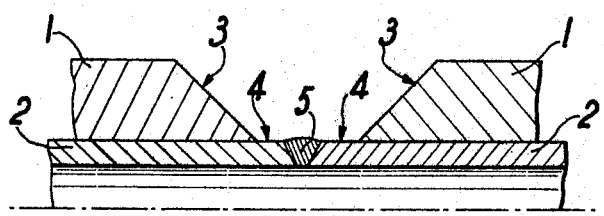
FIG. 3 shows the two tube elements of FIG. 2 after completion of the operation in which the internal liners of the two tube elements are welded without addition of filler metal.

Once the tubes are thus prepared, the two liner tubes 2 which are designated by the reference 5 in FIG. 3 are welded in an argon atmosphere without any filler metal.

Finally, an annular member 6 made up of two half-shells and having a shape such that it is applied in closely-fitting contact with the chamfered portions 3 is fitted in position so as to leave an annular space 7.

Figure 4:
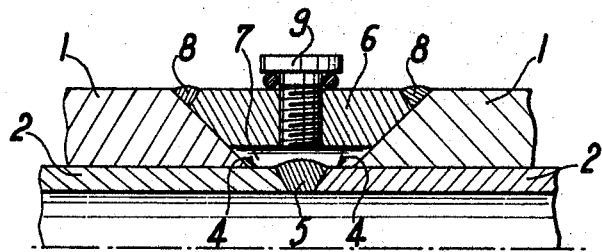
FIG. 4 shows the two tube elements after completion of assembly operations.

The two half-shells are joined by arc-welding without the use of filler metal. The annular member 6 is also welded to the two outer tubes 1 along its line of contact with each tube, as shown at 8 in FIG. 4.

The annular member is advantageously pierced by an internally threaded bore which can be plugged with a screw 9 fitted with a seal.

By means of the above-mentioned bore, the weld seam 5 between the two liner tubes 2 can be inspected at any time and it is also possible to introduce an inert gas into the annular space 7 for the purpose of protecting the weld seam 5.

Should it prove necessary to change the ducting, the method according to the invention makes it possible to make a cut at the requisite point in one of the tube elements and to re-join the two tube sections as shown in FIG. 2.

In the second form of execution of the method according to the invention:

The tube element as illustrated in FIG. 5 is made up of an outer tube 1 which may be formed of mild steel and which is fitted with an internal lining or liner tube 2, said liner tube being fabricated, for example, from the aluminum alloy $AG_3$. The end of the liner tube is bent outwards at 10 and a flange 6 of a second type or clamping-collar is screwed onto the threaded end portion 13 of the outer tube.

The assembly of the two tube elements is carried out as follows (referring first to FIG. 6):

When the clamping-collars 6 which are fitted on the ends of the two tube elements to be assembled have been withdrawn to a sufficient extent from the flanged ends 10 of the liner tubes, said two flanged ends 10 are welded around their outer periphery (as indicated by the reference numeral 5) without addition of filler metal; the clamping-collars 6 are then screwed up until they are forcibly applied against the flanged ends 10 and the two clamping-collars are then joined together by welding along the line 9, thus leaving an annular space 7.

By virtue of the above method of assembly, the two tube elements can readily be disassembled in the event of replacement of the ducting.

Accordingly, when said tube elements are assembled as shown in FIG. 7a, the two clamping-collars 6 are separated by cutting along their line of junction, then withdrawn from the two flanged ends 10 as shown in FIG. 7b and the flanged ends 10 are cut along their welded periphery; thus, the two tube elements are separated from each other and one of them can be replaced by a new element which can readily be joined to the first in accordance with the method of the invention.

In accordance with an alternative form of the second mode of execution of the method according to the invention which is shown in FIGS. 8 and 9, the clamping-collars 11 which are screwed onto a threaded portion 12 are not joined by welding as is the case with the collars 6 but are assembled together by screwing. In this case, the first stage of disassembly of the tubes (as shown in FIG. 7a) consists in removing the screws by which said clamping-collars are coupled together.

What we claim is:

1. A method of assembly of two tube elements by welding without the use of filler metal, each tube element being constituted by an outer tube formed of a first metal and by a lining formed of a second metal, said method being characterized in that it consists in trimming away each end portion of the outer tube so as to free the tube lining at each extremity of the tube elements to be assembled, welding said tube lining extremities to each other without the use of filler metal and securely joining the outer tubes of the two tube elements to be assembled by means of two metallic members which are welded to each other without filler metal so as to constitute a shell-type assembly which surrounds the weld seam of said tube linings.

2. A method of assembly in accordance with claim 1, characterized in that it consists in cutting a chamfered edge near the extremity of each outer tube of the two tube elements to be assembled and in baring the tube lining over a short distance, in joining the ends of the linings of the two tube elements by welding without filler metal, in fitting between the chamfered edges of the two outer tubes a metallic member which is applied in closely-fitting contact with said chamfered edges but which does not come into contact with the tube linings and in joining said metallic member to the two outer tubes by welding without filler metal along the external line of contact of said member with each of said two outer tubes.

3. A method of assembly in accordance with claim 2, characterized in that a bore which can be sealed at will is formed in the metallic member in order that the state of the joint formed between the two tube linings may be inspected at any time and also in order that an inert gas may be introduced through said bore into the annular space formed between said metallic member and the tube linings.

4. A method of assembly in accordance with claim 1, characterized in that it consists in providing a screw-thread on the outer tubes at the ends of the tube elements to be assembled, in screwing a clamping-collar on each of the two threaded ends, in outwardly flanging the two tube linings at each end of the tube elements to be assembled, in welding said two flanged portions to each other along the outer periphery thereof without the use of filler metal, in displacing the two clamping-collars along the threaded tube-ends until said collars are applied against the flanged portions and in joining said two clamping-collars by welding.

References Cited

UNITED STATES PATENTS

| | | | |
|---|---|---|---|
| 1,989,614 | 1/1935 | Halpern et al. | 285—286 XR |
| 2,308,307 | 1/1943 | Robinson | 29—471.1 XR |
| 3,107,421 | 10/1963 | Turnbull | 29—471.1 |
| 3,248,134 | 4/1966 | Pennington | 29—471.1 XR |
| 3,284,108 | 11/1966 | West | 285—55 |

JOHN F. CAMPBELL, Primary Examiner

R. B. LAZARUS, Assistant Examiner

U.S. Cl. X.R.

29—473.3, 484; 285—286